US012342165B2

(12) United States Patent
Xie

(10) Patent No.: US 12,342,165 B2
(45) Date of Patent: Jun. 24, 2025

(54) SYSTEM, METHOD, STORAGE MEDIUM AND EQUIPMENT FOR MOBILE NETWORK ACCESS

(71) Applicant: CloudMinds Robotics Co., Ltd., Shanghai (CN)

(72) Inventor: Hui Xie, Shanghai (CN)

(73) Assignee: CloudMinds Robotics Co., Ltd., Shanghai (CN)

( * ) Notice: Subject to any disclaimer, the term of this patent is extended or adjusted under 35 U.S.C. 154(b) by 421 days.

(21) Appl. No.: 17/565,875

(22) Filed: Dec. 30, 2021

(65) Prior Publication Data

US 2022/0174490 A1 Jun. 2, 2022

Related U.S. Application Data

(63) Continuation of application No. PCT/CN2021/120009, filed on Sep. 23, 2021.

(30) Foreign Application Priority Data

Nov. 27, 2020 (CN) .......................... 202011359296.8

(51) Int. Cl.
*H04W 12/06* (2021.01)
*H04W 12/0431* (2021.01)
(Continued)

(52) U.S. Cl.
CPC ..... *H04W 12/069* (2021.01); *H04W 12/0431* (2021.01); *H04W 12/082* (2021.01)

(58) Field of Classification Search
CPC ........... H04W 12/069; H04W 12/0431; H04W 12/082; H04W 8/12; H04L 9/50; H04L 9/3268
See application file for complete search history.

(56) References Cited

U.S. PATENT DOCUMENTS 10,547,457 B1    1/2020   Duccini et al.
2016/0087972 A1* 3/2016   Ahmavaara ......... H04W 12/043
                                                    726/10
(Continued)

FOREIGN PATENT DOCUMENTS

CN    108702622 A    10/2018
CN    109344628 A    2/2019
(Continued)

OTHER PUBLICATIONS

European search report with the supplementary European search report and the European search opinion issued by the European Patent Office for European Patent Application No. 21 827 376.1, mailed on Jul. 6, 2022.
(Continued)

*Primary Examiner* — Harunur Rashid
(74) *Attorney, Agent, or Firm* — Myers Wolin, LLC

(57) ABSTRACT

The disclosure relates to a System, Method, Storage medium and Equipment for Mobile Network Access. The system includes: a first certificate authority node located in a block chain network, configured to authorize a first authentication certificate indicating an identity of the first network authentication service node to the first network authentication service node, authorize a first UE certificate indicating an identity of user equipment to the user equipment of the first operator, and store first UE certificate revocation information and a first CA certificate indicating an identity of the first certificate authority node to a block chain, and a first network authentication service node, configured to obtain the first UE certificate revocation information and the first CA certificate from the block chain, perform mutual identity authentication with the user equipment when receiving a first access authentication message, make the user equip- (Continued)

ment access a mobile network when completing the authentication.

8 Claims, 9 Drawing Sheets

(51) Int. Cl.
*H04W 12/069* (2021.01)
*H04W 12/082* (2021.01)

(56) References Cited

U.S. PATENT DOCUMENTS

| | | | |
|---|---|---|---|
| 2019/0036712 A1 | 1/2019 | Qiu | |
| 2019/0261178 A1* | 8/2019 | Rajadurai | H04W 12/069 |
| 2020/0374138 A1* | 11/2020 | Honjo | H04L 9/3268 |
| 2021/0266311 A1* | 8/2021 | Zeng | H04L 9/3273 |

FOREIGN PATENT DOCUMENTS

| | | |
|---|---|---|
| CN | 107079007 B | 3/2019 |
| CN | 109417709 A | 3/2019 |
| CN | 106372941 B | 7/2019 |
| CN | 110569674 A | 12/2019 |
| CN | 110572824 A | 12/2019 |
| CN | 108235806 B | 10/2020 |
| CN | 109242467 B | 1/2021 |
| CN | 111556035 B | 4/2022 |
| WO | 2017/104899 A1 | 6/2017 |
| WO | WO-2019104690 A1 * | 6/2019 ............ H04L 63/08 |
| WO | 2019/198131 A1 | 10/2019 |
| WO | 2020/223319 A1 | 11/2020 |

OTHER PUBLICATIONS

Praveen et al., "Blockchain for 5G: A Prelude to Future Telecommunication", IEEE Network, IEEE Service Center, Mar. 2020, pp. 106-113, XP011823351, vol. 34, No. 6, New York, NY, USA.

3GPP TS 33.501 V16.4.0, 3rd Generation Partnership Project; Technical Specification Group Services and System Aspects; Security architecture and procedures for 5G system (Release 16), Sep. 2020.

Higashikado et al., "A study on certificate management in consortium chain", 2017 Symposium on Cryptography and Information Security, The Institute of Electronics, Information and Communication Engineers, Jan. 2017, Naha, Japan, with an English abstract.

3GPP TS 33.501 V15.10.0, "Annex B (informative): Using additional EAP methods for primary authentication", Release 15, Sep. 2020.

Notice of Reasons for Refusal issued by the Japan Patent Office for Japanese Patent Application No. 2021-577675, mailed on Mar. 22, 2023, with an English translation.

* cited by examiner

SYSTEM, METHOD, STORAGE MEDIUM AND EQUIPMENT FOR MOBILE NETWORK ACCESS

CROSS-REFERENCE TO RELATED APPLICATION

The present application is a continuation application under 35 U.S.C. § 120 of PCT application No. PCT/CN2021/120009 filed on Sep. 23, 2021, which claims foreign priority to Chinese Patent Application No. 202011359296.8 filed on Nov. 27, 2020, and designated the U.S., the contents of which are incorporated herein by reference.

TECHNICAL FIELD

The disclosure relates to the field of information technology, and particularly relates to a mobile network access system and method, a non-transitory computer-readable storage medium and an electronic device.

BACKGROUND

In 2G/3G/4G mobile communication networks, the authentication of user equipment (UE) accessing a mobile network is based on a symmetric cryptography mechanism, that is, the same key is used for encryption and decryption, and the same key is used by mobile operators and the user equipment, resulting in the lack of guarantee of mobile communication security. In addition, every time a user uses a symmetric encryption algorithm for mobile network access requests, a unique key that others do not know needs to be used, which makes the number of keys owned by the mobile operators and the user equipment increase exponentially, increasing the burden of key management of the mobile operators and the user equipment.

Therefore, in a 5G mobile communication network, an access authentication method based on an asymmetric cryptography mechanism is introduced, that is, a pair of keys, a public key and a private key, are used. The private key is the only key, which is safely kept by the mobile operators and cannot be leaked. The public key is sent to any user equipment requesting access. The asymmetric encryption mechanism uses the pair of keys for encryption, which can improve the security of mobile communication and reduce the burden of key management. However, although asymmetric encryption uses the pair of keys, if the user equipment illegally obtains the public key of an authentication server, it can illegally access a mobile network, and the security of mobile network access is also low.

SUMMARY

The object of the disclosure is to provide a mobile network access system and method, a non-transitory computer-readable storage medium and an electronic device, so as to solve the problem of low security of mobile network access of a terminal device.

To implement the object, a first aspect of the examples of the disclosure provides a mobile network access system, including a first network authentication service node and a first certificate authority node located in a block chain network. The first network authentication service node and the first certificate authority node belong to a first operator.

The first certificate authority node is configured to authorize a first authentication certificate indicating an identity of the first network authentication service node to the first network authentication service node, authorize a first UE certificate indicating an identity of user equipment of the first operator to the user equipment of the first operator, and store first UE certificate revocation information and a first CA certificate indicating an identity of the first certificate authority node to a block chain.

The first network authentication service node is configured to obtain the first UE certificate revocation information and the first CA certificate from the block chain, perform mutual identity authentication with the user equipment of the first operator on the condition that a first access authentication message of the user equipment of the first operator have been received, and make the user equipment of the first operator access a mobile network on the condition that the mutual identity authentication have been completed.

Optionally, the system further includes a second network authentication service node and a second certificate authority node located in the block chain network. The second network authentication service node and the second certificate authority node belong to a second operator.

The first certificate authority node is further configured to write a first roaming license certificate authorized for the second certificate authority node into the block chain.

The second certificate authority node is configured to authorize a second authentication certificate indicating an identity of the second network authentication service node to the second network authentication service node, authorize a second UE certificate indicating an identity of user equipment of the second operator to the user equipment of the second operator, store second UE certificate revocation information and a second CA certificate indicating an identity of the second certificate authority node to a block chain, and write a second roaming license certificate authorized for the first certificate authority node into the block chain.

Optionally, the first CA certificate and the first UE certificate authorized by the first certificate authority node to the user equipment of the first operator are preset in an identification card of the user equipment of the first operator;

The first authentication certificate authorized by the first certificate authority node to the first network authentication service node is preset in the first network authentication service node or stored in the block chain.

A second aspect of the examples of the disclosure provides a mobile network access method. The method is used to a first network authentication service node in the system of the first aspect, and includes:

receiving first access authentication information sent by user equipment of a first operator, where the first access authentication information includes a first UE certificate;

obtaining first UE certificate revocation information and a first CA certificate from a block chain;

verifying whether the first UE certificate is authorized by the first certificate authority node according to the public key in the first CA certificate, and determining whether the first UE certificate is revoked according to the first UE certificate revocation information; and sending a second access authentication message to the user equipment of the first operator when determined that the first UE certificate is authorized by the first certificate authority node and the first UE certificate is not revoked, wherein the second access authentication message includes the first authentication certificate, and the first authentication certificate is configured to perform identity authentication by the user equipment of the first operator on the first network authentication service node and make the user equipment of the first operator access a mobile network on the condition that the identity authentication passes.

Optionally, the method is used to the first network authentication service node in the mobile network access system and further includes:

receiving third access authentication information sent by user equipment of a second operator, wherein the third access authentication information includes the second UE certificate;

obtaining the first CA certificate, a first roaming license certificate and a second roaming license certificate from the block chain;

on the condition of that the first CA certificate, the second UE certificate, the first roaming license certificate and the second roaming license certificate have been obtained, verifying whether the first roaming license certificate is authorized by the first certificate authority node according to the public key in the first CA certificate and verifying whether the second UE certificate is authorized by a second certificate authority node according to the public key of the second certificate authority node in the second roaming license certificate; and sending a fourth access authentication message to the user equipment of the second operator on the condition that the first roaming license certificate is authorized by the first certificate authority node and the second UE certificate is authorized by the second certificate authority node have been determined, the fourth access authentication message includes the first authentication certificate and the first roaming license certificate, and the first authentication certificate and the first roaming license certificate are configured to perform identity authentication by the user equipment of the second operator on the first network authentication service node and make the user equipment of the second operator access the mobile network on the condition that the identity authentication passes.

A third aspect of the examples of the disclosure provides a mobile network access method. The method is used to user equipment of a first operator, and includes:

sending first access authentication information to a first network authentication service node, the first network authentication service node is the first network authentication service node in the system of the first aspect, and the first access authentication information includes a first UE certificate;

receiving a second access authentication message sent by the first network authentication service node, where the second access authentication message includes a first authentication certificate;

verifying whether the first authentication certificate is authorized by a first authority node according to a public key in a preset first CA certificate; and accessing the user equipment to the mobile network on the condition that the first authentication certificate is authorized by the first authority node have been determined.

Optionally, the method further includes:

sending a fifth access authentication information to a second network authentication service node, where the second network authentication service node is the second network authentication service node in the mobile network access system, and the fifth access authentication information includes a second UE certificate;

receiving a sixth access authentication message sent by the second network authentication service node, where the sixth access authentication message includes a second authentication certificate and a first roaming license certificate;

verifying whether the first roaming license certificate is authorized by the first certificate authority node according to a public key in the preset first CA certificate, and verifying whether the second authentication certificate is authorized by a second certificate authority node according to a public key of the second certificate authority node in the first roaming license certificate; and accessing the user equipment to the mobile network on the condition that the first roaming license certificate is authorized by the first certificate authority node and the second authentication certificate is authorized by the second certificate authority node have been determined.

A fourth aspect of the examples of the disclosure, a network authentication server storage medium is provided, the storage medium stores a computer program thereon. the computer program is used to execute the method for mobile network access according to the second aspect.

A fifth aspect of the examples of the disclosure, a user equipment storage medium is provided, the storage medium stores a computer program thereon. the computer program is used to execute the method for mobile network access according to the third aspect.

A sixth aspect of the examples of the disclosure, a network authentication server is provided and including:
 a memory, storing a computer program thereon; and
 a processor, configured to execute the computer program in the memory to implement steps of the method of the second aspect.

A seventh aspect of the examples of the disclosure, a user equipment is provided and, including:
 a memory, storing a computer program thereon; and
 a processor, configured to execute the computer program in the memory to implement steps of the method of the third aspect.

By means of the above technical solutions, at least the following beneficial effects can be achieved:

The first certificate authority node is configured to authorize the first authentication certificate indicating the identity of the first network authentication service node to the first network authentication service node, authorize the first UE certificate indicating the identity of the user equipment of the first operator to the user equipment of the first operator, and store the first UE certificate revocation information and the first CA certificate indicating the identity of the first certificate authority node to the block chain; and the first network authentication service node is configured to obtain the first UE certificate revocation information and the first CA certificate from the block chain, perform the mutual identity authentication with the user equipment of the first operator when received the first access authentication message of the user equipment of the first operator, and make the user equipment of the first operator access the mobile network on the condition that the mutual identity authentication have been completed. Mobile network access authentication can be performed on the user equipment of the first operator nearby, and the security of mobile network access is improved. In addition, access of the terminal device can be realized in private or isolated mobile networks, which improves the convenience of mobile network access.

Other features and advantages of the disclosure will be described in detail in the subsequent detailed description.

BRIEF DESCRIPTION DRAWINGS

The accompanying drawings are intended to provide a further understanding of the disclosure, form a part of the description, and are used to explain the disclosure together with the following detailed description, but do not constitute a limitation of the disclosure. In the accompanying drawings.

DETAILED DESCRIPTION

The detailed description of the disclosure is described in detail below in combination with the accompanying drawings. It should be understood that the detailed description described herein is only used to illustrate and explain the disclosure and are not used to limit the disclosure.

It should be noted that in the disclosure, the terms "first", "second" and the like in the description, claims and drawings are used to distinguish similar objects, and need not be understood as describing a specific order or sequence. Similarly, the terms "S301", "S401" and the like are used to distinguish the steps, and need not be understood as performing the method steps in a specific order or sequence.

Prior to introducing a mobile network access system and method, a storage medium and an electronic device provided by the disclosure, an application scenario of the disclosure is introduced first. The mobile network access system provided by the disclosure can allow user equipment to access a mobile network of an operator after completing authentication through the EAP-TLS authentication protocol. For example, the user equipment may be an electronic device with a mobile communication function such as a smart phone, a smart watch and a smart bracelet.

The inventor found that during access authentication in related technologies, although asymmetric keys are adopted, if the user equipment illegally obtains a public key of an authentication server, it can illegally access a mobile network, and the security of mobile network access is also low. Moreover, in related technologies, the UE can only support the access of a corresponding mobile network and cannot roam between mobile networks of different operators. Therefore, when the UE is in a condition without a corresponding mobile network of operators, even if there are mobile networks of other operators in the area where the UE is located, the UE cannot access the mobile networks, which will make it inconvenient for the UE to access the mobile networks.

Figure 1:
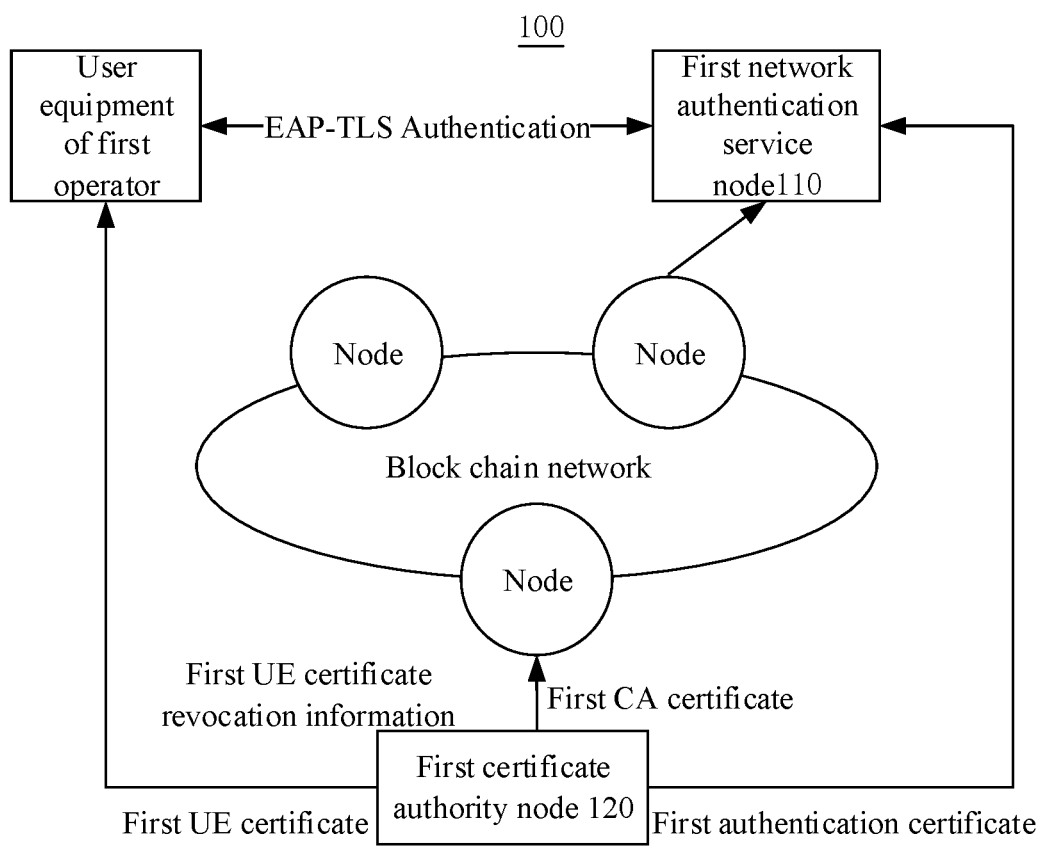
FIG. 1 is a block diagram of a mobile network access system illustrated according to an exemplary example.

To solve the above technical problems, the disclosure provides a mobile network access system. FIG. 1 is a block diagram of the mobile network access system illustrated according to an exemplary example. The system 100 is configured to execute mobile network access. As shown in FIG. 1, the system 100 includes: a first network authentication service node 110 and a first certificate authority node 120 located in a block chain network. The first network authentication service node 110 and the first certificate authority node 120 belong to a first operator.

The first certificate authority node 120 is configured to authorize a first authentication certificate indicating an identity of the first network authentication service node 110 to the first network authentication service node 110, authorize a first UE certificate indicating an identity of user equipment to the user equipment of the first operator, and store first UE certificate revocation information and a first CA certificate indicating an identity of the first certificate authority node to a block chain.

The first network authentication service node 110 is configured to obtain the first UE certificate revocation information and the first CA certificate from the block chain, perform mutual identity authentication with the user equipment on the condition that a first access authentication message of the user equipment of the first operator have been received, and make the user equipment access a mobile network on the condition that the mutual identity authentication have been completed.

The first network authentication service node 110 may be an authentication server function (AUSF), and the first network authentication service node 110 is in communication connection with any block chain node of the block chain and may obtain the first UE certificate revocation information and the first CA certificate from the block chain.

Optionally, the first network authentication service node 110 may perform the mutual identity authentication with the user equipment of the first operator through an EAP-TLS authentication protocol. The user equipment of the first operator may preferably establish communication with the nearest first network authentication service node 110 and then perform the mutual identity authentication therewith.

Optionally, the first certificate authority node 120 is further configured to authorize the first UE certificate revocation information which is used to represent that a corresponding first UE certificate is invalid.

Optionally, the first CA certificate and the first UE certificate authorized by the first certificate authority node 120 to the user equipment are preset in an identification card of the user equipment. Specifically, the identification card may be a USIM card which stores the first UE certificate authorized by the first certificate authority node 120 when leaving the factory. Further, after the USIM card is installed to the user equipment, the user equipment may generate a private key based on the first UE certificate. The identification card may also be an e-SIM card, and after a user selects an operator package, the user equipment may generate a private key based on the first UE certificate.

Optionally, the first network authentication service node 110 and the first certificate authority node 120 may serve as one node of the block chain network.

Optionally, the first authentication certificate authorized by the first certificate authority node 120 to the first network authentication service node 110 is preset in the first network authentication service node 110 or stored in the block chain.

Exemplarily, the first certificate authority node 120 stores the first CA certificate indicating the identity thereof to the block chain, and, optionally, may also store the first CA certificate to any first network authentication service node 110. Moreover, the first certificate authority node 120 authorizes the first UE certificate indicating the identity of the user equipment of the first operator. The first UE certificate corresponds to the first CA certificate. In this way, when the user equipment of the first operator performs access authentication with the first network authentication service node 110 through the EAP-TLS authentication protocol, the first UE certificate may be matched with the first CA certificate.

Further, the first operator may authorize the first UE certificate revocation information through the first certificate authority node 120. In this way, the block chain or the first network authentication service node 110 may form a revocation list based on a plurality of first UE certificate revocation information. when received the first access authentication information of a user equipment of the first operator, the first network authentication service node 110 may determine whether the access qualification of the user equipment of the first operator is canceled according to the revocation list.

If the first network authentication service node 110 determines existence of the first UE certificate revocation information of the user equipment of the first operator in the revocation list, a user equipment revocation information is generated and feedbacks the user equipment revocation information to the user equipment. In this way, the user can conveniently know that the first UE certificate of the user equipment is revoked in time.

Further, on the condition that the first network authentication service node 110 determines inexistence of the first UE certificate revocation information of the user equipment of the first operator in the revocation list and the first UE certificate is matched with the first CA certificate, the user equipment accesses the mobile network.

The first certificate authority node is configured to authorize the first authentication certificate indicating the identity of the first network authentication service node to the first network authentication service node, authorize the first UE certificate indicating the identity of the user equipment to the user equipment of the first operator, and store the first UE certificate revocation information and the first CA certificate indicating the identity of the first certificate authority node to the block chain; and the first network authentication service node is configured to obtain the first UE certificate revocation information and the first CA certificate from the block chain, perform the mutual identity authentication with the user equipment of the first operator when received the first access authentication message of the user equipment of the first operator, and make the user equipment access the mobile network on the condition that the mutual identity authentication have been completed. Mobile network access authentication can be performed on the user equipment of the first operator nearby, and the security of mobile network access is improved. In addition, access of a terminal device can be realized in private or isolated mobile networks, which improves the convenience of mobile network access.

Figure 2:
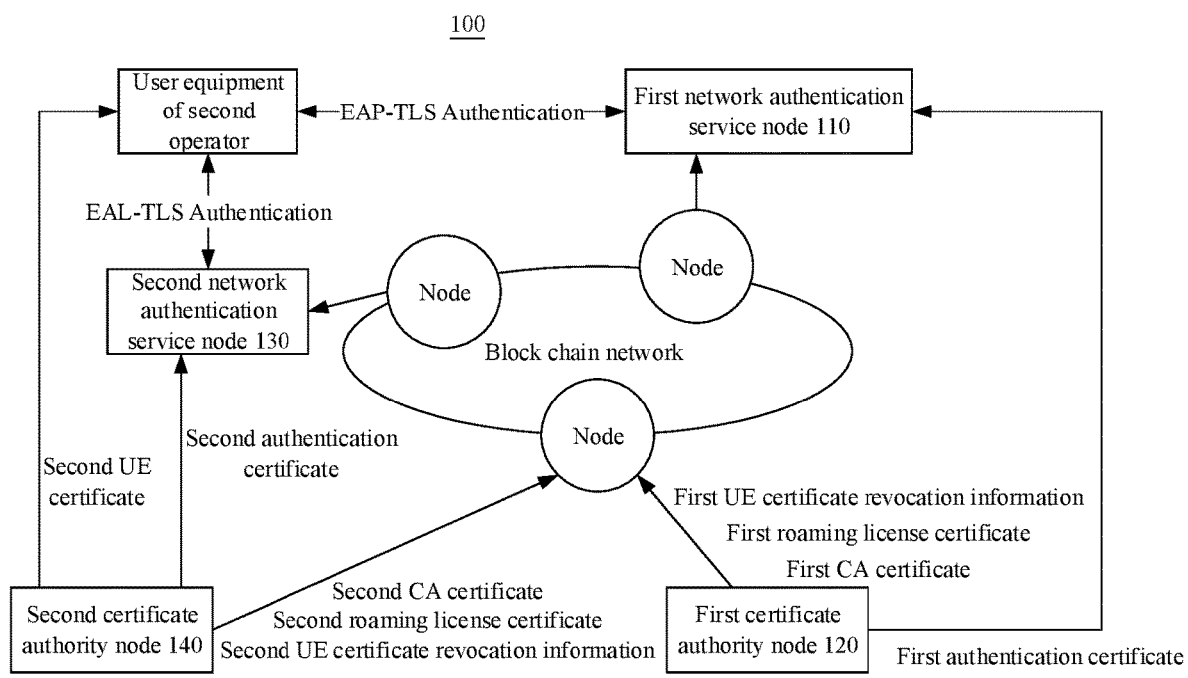
FIG. 2 is a block diagram of another mobile network access system illustrated according to an exemplary example.

Optionally, referring to FIG. 2 which is a block diagram of another mobile network access system, as shown in FIG. 2, the system 100 further includes a second network authentication service node 130 and a second certificate authority node 140 located in the block chain network. The second network authentication service node 130 and the second certificate authority node 140 belong to a second operator.

The first certificate authority node 120 is further configured to write a first roaming license certificate authorized for the second certificate authority node 140 into the block chain.

The second certificate authority node 140 is configured to authorize a second authentication certificate indicating an identity of the second network authentication service node 130 to the second network authentication service node 130, authorize a second UE certificate indicating an identity of user equipment to the user equipment of the second operator, store second UE certificate revocation information and a second CA certificate indicating an identity of the second certificate authority node 140 to a block chain, and write a second roaming license certificate authorized for the first certificate authority node 120 into the block chain.

Optionally, the first network authentication service node 110, the first certificate authority node 120, the second network authentication service node 130 and the second certificate authority node 140 may serve as one node of the block chain network.

During specific implementation, the first operator and the second operator need to agree a roaming protocol, the first operator authorizes the first roaming license certificate for the second certificate authority node 140 through the first certificate authority node 120, and the second operator authorizes the second roaming license certificate for the first certificate authority node 120 through the second certificate authority node 140. The first certificate authority node 120 uploads the first roaming license certificate to the block chain for storage, and the second certificate authority node 140 uploads the second roaming license certificate to the block chain for storage.

Further, the second certificate authority node 140 authorizes the second CA certificate indicating the identity of the second certificate authority node 140, and the first UE certificate authorized by the first certificate authority node 120 and the second UE certificate authorized by the second certificate authority node 140 are preset in the USIM card of the user equipment.

Further, the first certificate authority node 120 writes the first UE certificate revocation information into the block chain network which authorized by the first certificate authority node 120, and the second certificate authority node 140 also writes the second UE certificate revocation information into the block chain network which authorized by the second certificate authority node 140, so that a revocation list is established in the block chain network according to the plurality of first UE certificate revocation information and the plurality of second UE certificate revocation information. Then, on the condition that any network authentication service node receives access authentication information sent by any user equipment, the corresponding network authentication service node may determine whether corresponding UE certificate revocation information exists, according to the revocation list in the block chain, thereby determining whether the first UE certificate or the second UE certificate of the user equipment is revoked.

It is worth noting that the system of the examples of the disclosure is not limited to the 5th generation mobile communication network. In other scenarios where a similar certificate-based authentication access method is adopted, the system can be adopted to realize access authentication of a single service subject or service-crossing subjects.

Using the above system, the roaming and nearby access of the UE in mobile networks of different operators can be realized. While making up for the defect that UE roaming in the mobile networks of the different operators is not supported under the EAP-TLS authentication method, it also avoids the inconvenience and resource overhead caused by the fact that the access authentication must be performed at the UE's home location, and improves the convenience of mobile network access of the terminal device.

Figure 3:
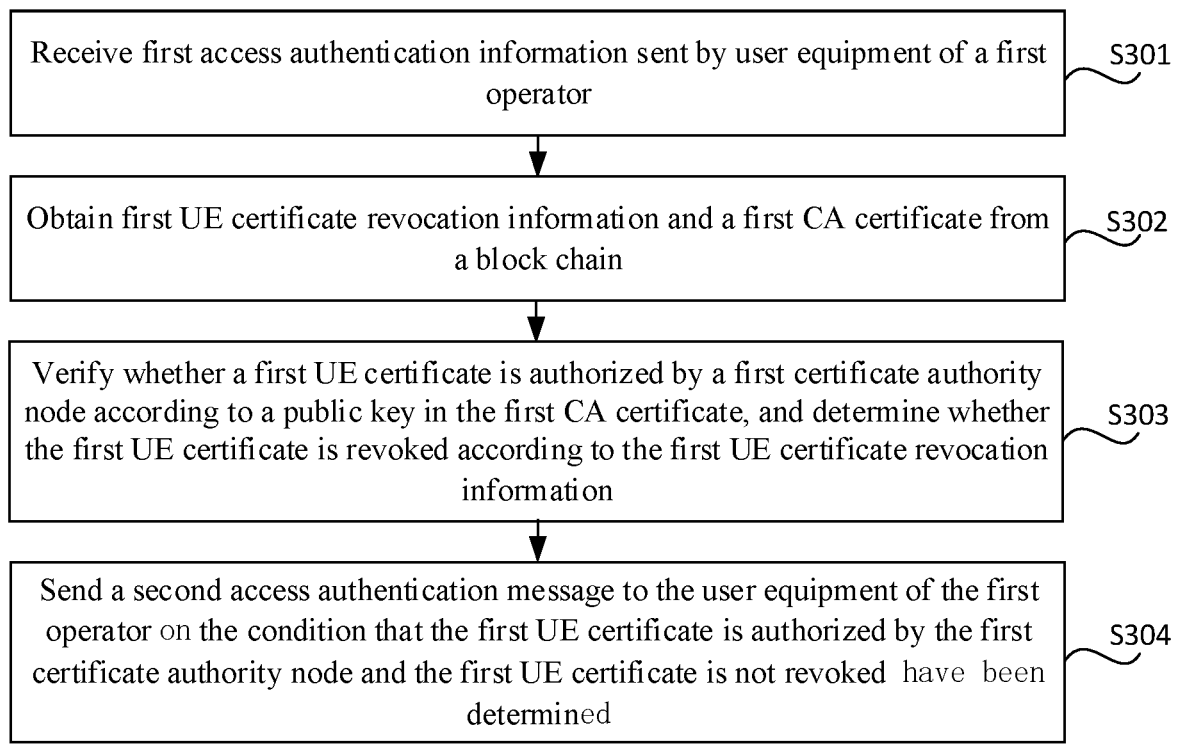
FIG. 3 is a flow diagram of a mobile network access method illustrated according to an exemplary example.

Based on the same inventive concept, the disclosure further provides a mobile network access method. The method is used to a first network authentication service node in a mobile network access system. FIG. 3 is a flow diagram of the mobile network access method illustrated according to an exemplary example. Referring to FIG. 3, the method includes the following steps.

In step S301, first access authentication information sent by user equipment of a first operator is received.

The first access authentication information includes a first UE certificate.

In step S302, first UE certificate revocation information and a first CA certificate are obtained from a block chain.

In step S303, whether a first UE certificate is authorized by a first certificate authority node is verified according to a public key in the first CA certificate, and whether the first UE certificate is revoked is determined according to the first UE certificate revocation information.

In step S304, a second access authentication message is sent to the user equipment of the first operator when determined that the first UE certificate is authorized by the first certificate authority node and the first UE certificate is not revoked.

The second access authentication message includes the first authentication certificate, and the first authentication certificate is configured to perform identity authentication by the user equipment of the first operator on the first network authentication service node and make the user equipment of the first operator access a mobile network on the condition that the identity authentication passes.

During specific implementation, the first network authentication service node extracts the first UE certificate from the first access authentication information and then based on the first UE certificate, searches, whether the UE certificate revocation information of the user equipment of the first operator is existed in the revocation list of the block chain.

Optionally, on the condition that existence of the UE certificate revocation information of the user equipment of the first operator in the revocation list of the block chain have been determined, the first network authentication service node determines that the user equipment of the first operator has been revoked and then generates a user equipment revocation information and feedbacks the user equipment revocation information to the user equipment. In this way, the user can conveniently know that the user equipment fails to access the mobile network because the first UE certificate of the user equipment is revoked in time.

Further, on the condition that inexistence of the UE certificate revocation information of the first operator in the revocation list of the block chain have been determined, the first network authentication service node determines that the user equipment of the first operator is not revoked.

Further, on the condition that the user equipment of the first operator is not revoked have been determined, the first network authentication service node obtains a public key from the first CA certificate and verifies whether the first UE certificate is authorized by the first certificate authority node according to the public key. For example, a private key of the first UE certificate may be verified according to the public key, and if the public key and the private key are matched, it is determined that the first UE certificate is authorized by the first certificate authority node.

Further, on the condition that the first UE certificate is authorized by the first certificate authority node have been determined, the first network authentication service node generates the second access authentication message and sends the second access authentication message to the user equipment of the first operator, then the user equipment of the first operator verifies the identity of the first network authentication service node according to a private key of the first authentication certificate. Therefore, identity authentication of the first network authentication service node on the user equipment of the first operator is realized. In this way, the security and convenience of mobile network access can be improved.

Figure 4:
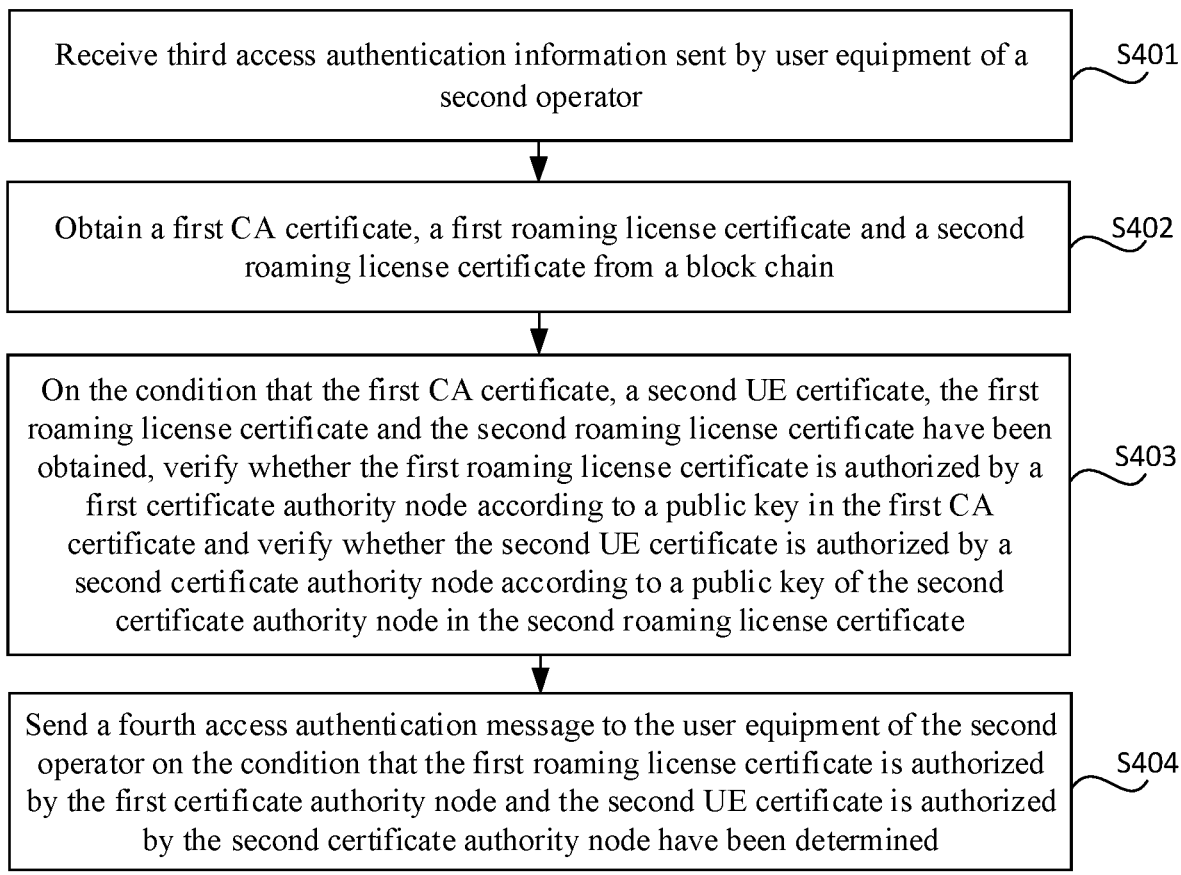
FIG. 4 is a flow diagram of another mobile network access method illustrated according to an exemplary example.

Optionally, FIG. 4 is a flow diagram of another mobile network access method illustrated according to an exemplary example. Referring to FIG. 4, the method further includes the following steps.

In step S401, a third access authentication information sent by user equipment of a second operator is received.

The third access authentication information includes a second UE certificate.

In step S402, a first CA certificate, a first roaming license certificate and a second roaming license certificate are obtained from the block chain.

In step S403, on the condition that the first CA certificate, the second UE certificate, the first roaming license certificate and the second roaming license certificate have been obtained, whether the first roaming license certificate is authorized by the first certificate authority node is verified according to the public key in the first CA certificate, and whether the second UE certificate is authorized by a second certificate authority node is verified according to the public key of the second certificate authority node in the second roaming license certificate.

In step S404, a fourth access authentication message is sent to the user equipment of the second operator on the condition that the first roaming license certificate is authorized by the first certificate authority node and the second UE certificate is authorized by the second certificate authority node have been determined.

The fourth access authentication message includes the first authentication certificate and the first roaming license certificate, the first authentication certificate and the first roaming license certificate are configured to perform the identity of the first network authentication service node by the user equipment of the second operator, and make the user equipment of the second operator access the mobile network on the condition that the identity authentication passes.

During specific implementation, a first UE certificate authorized by the first certificate authority node and a second UE certificate authorized by the second certificate authority node are preset in an identification card of the user equipment of the second operator. Exemplarily, after the USIM card is installed to the user equipment of the second operator, the user equipment of the second operator may generate a first private key based on the first UE certificate and generate a second private key based on the second UE certificate. The user equipment of the second operator sends the third access authentication information to the first network authentication service node of a first operator based on the EAP-TLS authentication protocol, and when receiving the third access authentication information, the first network authentication service node extracts the second UE certificate from the third access authentication information.

Further, on the condition that the second UE certificate have been extracted, the first CA certificate, the first roaming license certificate and the second roaming license certificate are obtained from the block chain, then whether the first roaming license certificate is authorized by the first certificate authority node is verified according to the public key in the first CA certificate, and whether the second UE certificate is authorized by the second certificate authority node is verified according to the public key of the second certificate authority node in the second roaming license certificate.

For example, the private key of the first roaming license certificate may be verified according to the public key of the first CA certificate, and if the public key and the private key are matched, it is determined that the first roaming license certificate is authorized by the first certificate authority node. The private key of the second UE certificate may be verified according to the public key of the second certificate authority node in the second roaming license certificate, and if the public key and the private key are matched, it is determined that the second UE certificate is authorized by the second certificate authority node.

Further, the first network authentication service node generates a fourth access authentication message and sends the fourth access authentication message to the user equipment of the second operator, so that the user equipment of the second operator can verify the identity of the first network authentication service node according to the private key of the first authentication certificate and the private key of the first roaming license certificate.

Further, on the condition that the first roaming license certificate is not authorized by the first certificate authority node have been determined, that is, the public key in the first CA certificate and the private key of the first roaming license certificate are not matched, or, the second UE certificate is not authorized by the second certificate authority node, that is, the public key of the second certificate authority node in the second roaming license certificate and the private key of the second UE certificate are not matched, the first network authentication service node generates an illegally access information and sends the illegally access information to the user equipment of the second operator, so that the user can know access authentication failure information in time.

It is worth noting that the first UE certificate authorized by the first certificate authority node and the second UE certificate authorized by the second certificate authority node may also be preset in the identification card of a user equipment of the first operator, then an access authentication message may be sent to the second network authentication service node of the second operator, and then the user equipment of the first operator roams in the mobile network of the second operator.

By means of the above technical solutions, the user equipment of the second operator may access the mobile network of the first operator in a roaming manner, thereby realizing roaming nearby access of UE to mobile networks of different operators and improving convenience of mobile network access of a terminal device.

Figure 5:
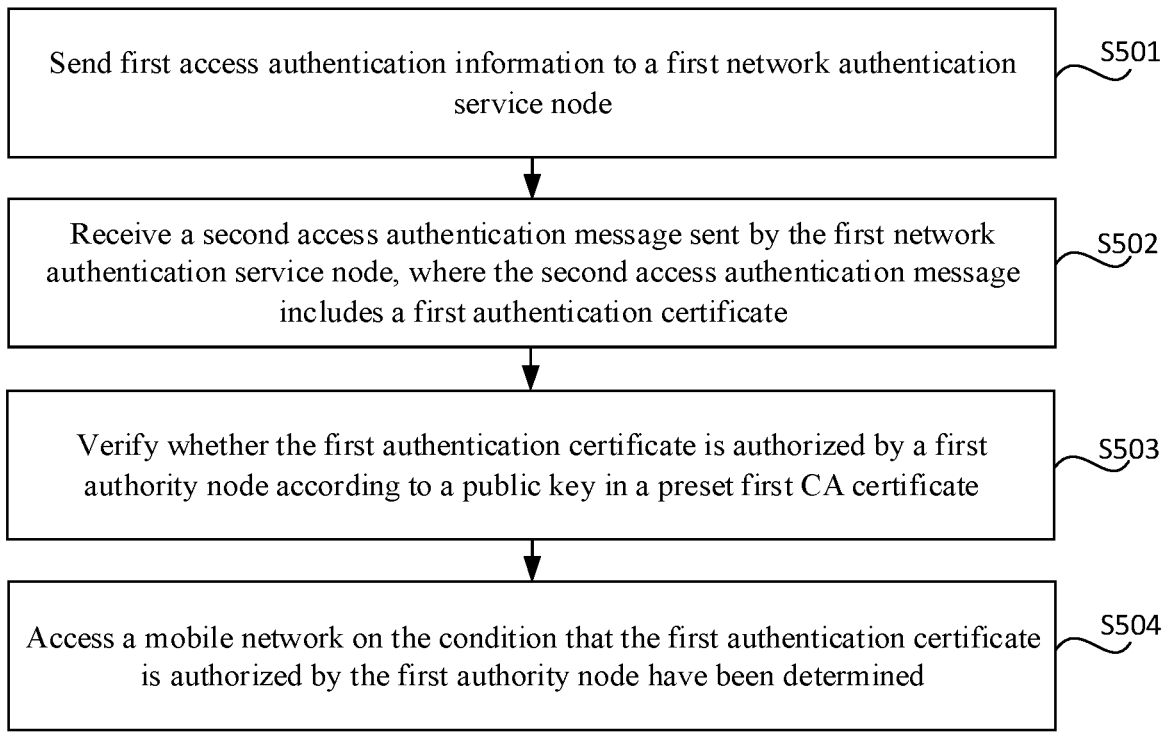
FIG. 5 is a flow diagram of a mobile network access method illustrated according to an exemplary example.

Based on the same inventive concept, the disclosure further provides a mobile network access method. The method is used to user equipment of the first operator. FIG. 5 is a flow diagram of the mobile network access method illustrated according to an exemplary example. Referring to FIG. 5, the method includes the following steps.

In step S501, a first access authentication information is sent to the first network authentication service node.

The first network authentication service node is the first network authentication service node 110 in the mobile network access system 100, and the first access authentication information includes the first UE certificate.

In step S502, the second access authentication message sent by the first network authentication service node is received. The second access authentication message includes the first authentication certificate.

In step S503, whether the first authentication certificate is authorized by the first authority node is verified according to the public key in a preset first CA certificate.

In step S504, the mobile network is accessed on the condition that the first authentication certificate is authorized by the first authority node have been determined.

Exemplarily, after a USIM card is installed to the user equipment, or on the condition that the user equipment accesses a mobile network again after the mobile network is disconnected, the user equipment of the first operator sends the first access authentication information to the first network authentication service node.

Further, on the condition that the second access authentication message sent by the first network authentication service node have been received, the first authentication certificate is extracted from the second access authentication message, and the first authentication certificate is verified. For example, the private key of the first authentication certificate is verified according to the public key in the preset first CA certificate, and on the condition that the public key in the first CA certificate and the private key of the first authentication certificate are matched, it is determined that the first authentication certificate is authorized by the first authority node. Then identity authentication of the user equipment of the first operator on the first network authentication service node is completed. Then the user equipment of the first operator accesses the mobile network of the first operator.

Further, on the condition that the first authentication certificate is not authorized by the first authority node have been determined, the user equipment of the first operator does not access the mobile network of the first operator. In this way, the security and convenience of mobile network access can be improved.

Figure 6:
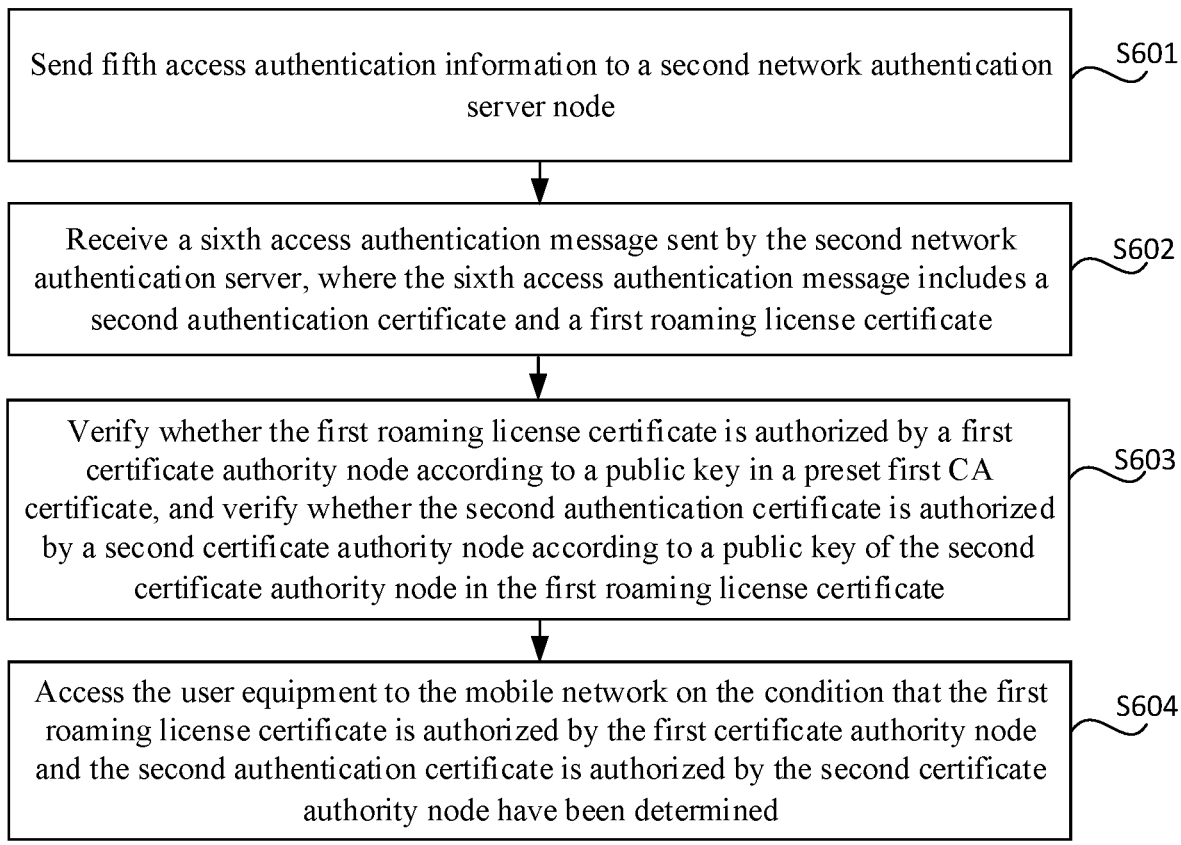
FIG. 6 is a flow diagram of another mobile network access method illustrated according to an exemplary example.

Optionally, FIG. 6 is a flow diagram of another mobile network access method illustrated according to an exemplary example. Referring to FIG. 6, the method further includes the following steps.

In step S601, a fifth access authentication information is sent to a second network authentication service node.

The second network authentication service node is the second network authentication service node 130 in the mobile network access system 100, and the fifth access authentication information includes a second UE certificate.

In step S602, a sixth access authentication message sent by the second network authentication service node. The sixth access authentication message includes the second authentication certificate and the first roaming license certificate.

In step S603, whether the first roaming license certificate is authorized by a first certificate authority node is verified according to the public key in a preset first CA certificate, and whether the second authentication certificate is authorized by a second certificate authority node is verified according to the public key of the second certificate authority node in the first roaming license certificate.

In step S604, the user equipment is accessed to the mobile network on the condition that the first roaming license certificate is authorized by the first certificate authority node and the second authentication certificate is authorized by the second certificate authority node have been determined.

During specific implementation, a first UE certificate authorized by the first certificate authority node and a second UE certificate authorized by the second certificate authority node may be preset in a USIM card of user equipment of the first operator, and on the condition that the user equipment of the first operator needs to access the mobile network of the second operator in a roaming manner, the fifth access authentication information is generated based on the second UE certificate, and the fifth access authentication information is sent to the second network authentication service node have been determined.

Further, on the condition that the sixth access authentication message is received, the second authentication certificate and the first roaming license certificate are extracted from the sixth access authentication message, a private key of the first roaming license certificate is verified according to the public key in the preset first CA certificate, and on the condition that the public key in the first CA certificate and the private key of the first authentication certificate are matched, it is determined that the first roaming license certificate is authorized by the first certificate authority node.

Further, a private key of the second authentication certificate is verified according to the public key of the second certificate authority node in the first roaming license certificate, and on the condition that the public key of the second certificate authority node in the first roaming license certificate and the private key of the second authentication certificate are matched, it is determined that the second authentication certificate is authorized by the second certificate authority node.

Further, on the condition that the first roaming license certificate is not authorized by the first certificate authority node have been determined, or the second authentication certificate is not authorized by the second certificate authority node have been determined, the user equipment of the first operator does not access the mobile network of the second operator.

It is worth noting that the user equipment of the second operator may also access the mobile network of the first operator in a roaming manner by means of the same method. It is omitted herein.

By means of the above technical solutions, the user equipment of the first operator may send an access authentication message to the second network authentication service node of the second operator to make the user equipment of the first operator roam in the mobile network of the second operator, thereby improving the convenience of mobile network access.

Figure 7:
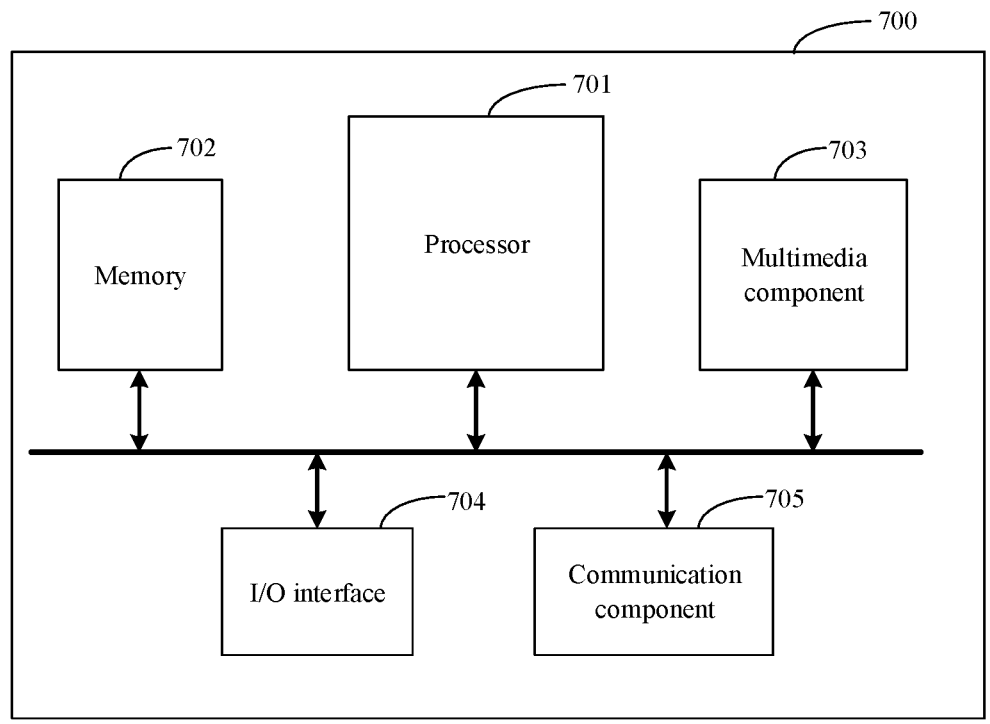
FIG. 7 is a block diagram of an electronic device 700 illustrated according to an exemplary example.

Based on the same inventive concept, an example of the disclosure further provides an electronic device 700. FIG. 7 is a block diagram of the electronic device 700 illustrated according to an exemplary example. Optionally, the electronic device 700 may be provided as one of the user equipment above. As shown in FIG. 7, the electronic device 700 may include: a processor 701 and a memory 702. The electronic device 700 may also include one or more of a multimedia component 703, an input/output (I/O) interface 704, and a communication component 705.

The processor 701 is configured to control overall operations of the electronic device 700 to complete all or part of the steps of the mobile network access method on a user equipment side above. The memory 702 is configured to store various types of data to support the operation of the electronic device 700. These data may include, for example, instructions of any application or method for operating on the electronic device 700, as well as application related data, such as contact data, received and sent messages, pictures, audios, videos, etc. The memory 702 may be implemented by any type of volatile or nonvolatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optic disk. The multimedia component 703 may include a screen and an audio component. The screen may be, for example, a touch screen, and the audio component is configured to output and/or input audio signals. For example, the audio component may include a microphone, and the microphone is configured to receive external audio signals. The received audio signals may be further stored in the memory 702 or transmitted via the communication component 705. The audio component further includes at least one speaker for outputting the audio signals. The I/O interface 704 provides an interface between the processor 701 and other interface modules which can be keyboards, mouses, buttons, etc. These buttons can be virtual buttons or physical buttons. The communication component 705 is used for wired or wireless communication between the electronic device 700 and other devices. Wireless communication, such as Wi-Fi, Bluetooth, near field communication (NFC), 2G, 3G, 4G, NB-IOT, eMTC, or other 5G, or a combination of one or several thereof, is not limited here. Therefore, the corresponding communication component 705 can include: a Wi-Fi module, a Bluetooth module, an NFC module, etc.

In an exemplary example, the electronic device 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, to execute the mobile network access method on the user equipment side above.

In another exemplary example, a computer-readable storage medium including program instructions is further provided. The program instructions, when executed by a processor, implement the steps of the mobile network access method on the user equipment side above. For example, the computer-readable storage medium can be the memory 702 including program instructions. The program instructions may be executed by the processor 701 of the electronic device 700 to complete the mobile network access method on the user equipment side above.

Figure 8:
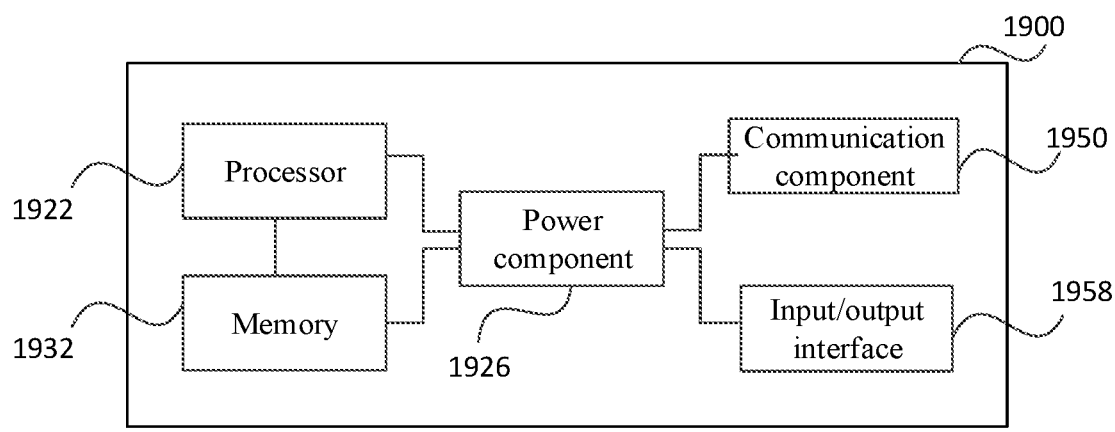
FIG. 8 is a block diagram of an electronic device 1900 illustrated according to an exemplary example.

Based on the same inventive concept, an example of the disclosure further provides an electronic device 1900. FIG. 8 is a block diagram of the electronic device 1900 illustrated according to an exemplary example. Optionally, the electronic device 1900 may be provided as a first network authentication service node in a mobile network access system. Referring to FIG. 8, the electronic device 1900 includes one or more processors 1922, and a memory 1932 configured to store a computer program executable by the processor 1922. The computer program stored in the memory 1932 may include one or more modules each corresponding to a set of instructions. In addition, the processor 1922 may be configured to execute the computer program to execute the mobile network access method on a first network authentication service node side above.

In addition, the electronic device 1900 may further include a power component 1926 and a communication component 1950. The power component 1926 may be configured to execute power management of the electronic device 1900, and the communication component 1950 may be configured to realize communication of the electronic device 1900, such as wired or wireless communication. In addition, the electronic device 1900 may further include an input/output (I/O) interface 1958. The electronic device 1900 may operate an operating system stored in the memory 1932, such as Windows Server™, Mac OS X™, Unix™, Linux™, etc.

In another exemplary example, a computer-readable storage medium including program instructions is further provided. The program instructions, when executed by a processor, implement the steps of the mobile network access method on the first network authentication service node side above. For example, the computer-readable storage medium can be the memory 1932 including program instructions. The program instructions may be executed by the processor 1922 of the electronic device 1900 to complete the mobile network access method on the first network authentication service node side above.

In another exemplary example, a computer program product is further provided. The computer program product contains a computer program executable by a programmable apparatus. The computer program has a code part which is configured to, when executed by the programmable apparatus, execute the mobile network access method on the first network authentication service node side above.

To implement the above examples, the disclosure further provides a computing processing device, including:
a memory, storing a computer-readable code therein; and
one or more processors. When the computer-readable code is executed by the one or more processors, the computing processing device executes the aforementioned mobile network access method.

To implement the examples above, the disclosure further provides a computer program, including a computer-readable code. The computer-readable code, when running on a computing processing device, causes the computing processing device to execute the aforementioned mobile network access method.

The aforementioned computer-readable storage medium of the disclosure stores the aforementioned computer program.

Figure 9:
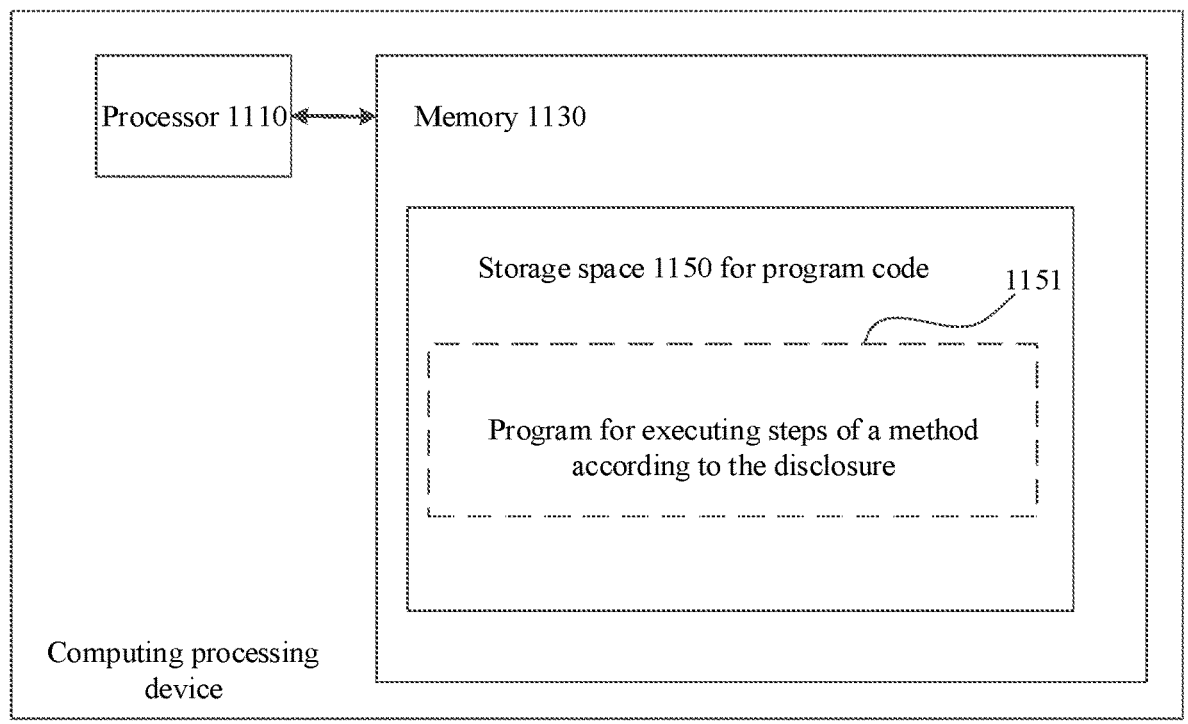
FIG. 9 is a schematic structural diagram of a computing processing device provided by an example of the disclosure.
Figure 10:
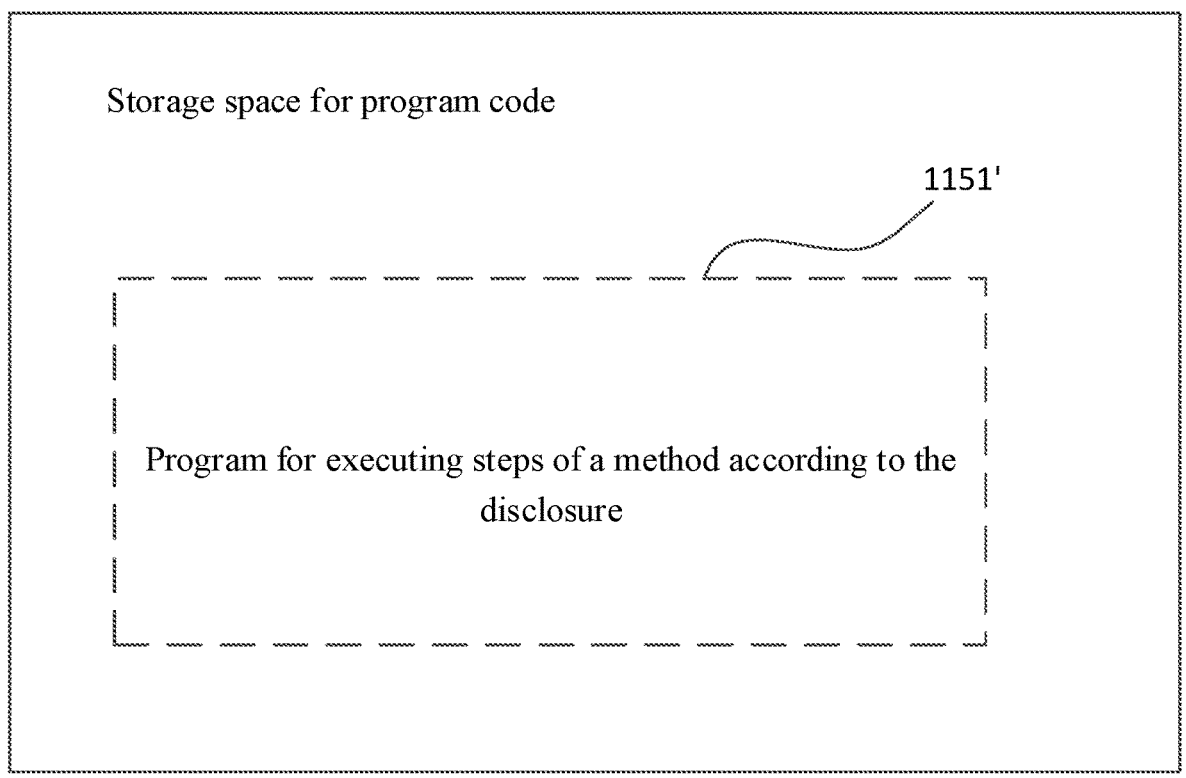
FIG. 10 is a schematic diagram of a portable or fixed storage unit of a program code configured to implement a method in accordance with the disclosure provided by an example of the disclosure.

FIG. 9 is a schematic structural diagram of a computing processing device provided by an example of the disclosure. The computing processing device typically includes a processor 1110 and a computer program product or computer-readable medium in the form of a memory 1130. The memory 1130 may be an electronic memory such as a flash memory, an electrically erasable programmable read-only memory (EEPROM), an EPROM, a hard disk, or a ROM. The memory 1130 has a storage space 1150 of a program code 1151 for executing any method step in the above method. For example, the storage space 1150 for the program code may include each program code 1151 for implementing various steps in the above method. These program codes may be read from or written into one or more computer program products. These computer program products include program code carriers such as a hard disk, a compact disk (CD), a memory card, or a floppy disk. Such computer program products are usually a portable or fixed storage unit as shown in FIG. 10. The storage unit may have storage segments, storage spaces, and the like arranged similarly to the memory 1130 in the computing processing device of FIG. 9. The program codes may be compressed, for example, in an appropriate form. Typically, the storage unit includes a computer-readable code 1151', namely a code that can be read by a processor such as 1110, which, when run by a server, causes the server to execute the various steps in the method described above.

The preferred embodiments of the disclosure are described in detail above in combination with the accompanying drawings. However, the disclosure is not limited to the specific details of the above embodiments. Within the scope of the technical concept of the disclosure, a variety of simple modifications can be made to the technical solutions of the disclosure, and these simple modifications belong to the protection scope of the disclosure.

In addition, it should be noted that the specific technical features described in the above detailed description can be combined in any suitable way without contradiction. In order to avoid unnecessary repetition, various possible combination methods will not be described separately in the disclosure.

In addition, various different embodiments of the disclosure can also be combined arbitrarily. As long as they do not violate the idea of the disclosure, they should also be regarded as the contents disclosed in the disclosure.

EXAMPLES

1. A mobile network access system, including a first network authentication service node and a first certificate authority node located in a block chain network, where the first network authentication service node and the first certificate authority node belong to a first operator;
the first certificate authority node is configured to authorize a first authentication certificate indicating an identity of the first network authentication service node to the first network authentication service node, authorize a first UE certificate indicating an identity of user equipment to the user equipment of the first operator, and store first UE certificate revocation information and a first CA certificate indicating an identity of the first certificate authority node to a block chain; and
the first network authentication service node is configured to obtain the first UE certificate revocation information and the first CA certificate from the block chain, perform mutual identity authentication with the user equipment on the condition that a first access authentication message of the user equipment of the first operator have been received, and make the user equipment access a mobile network on the condition that the mutual identity authentication have been completed.

2. The system according to example 1, further includes: a second network authentication service node and a second certificate authority node located in the block chain network, where the second network authentication service node and the second certificate authority node belong to a second operator;
the first certificate authority node is further configured to write a first roaming license certificate authorized for the second certificate authority node into the block chain; and
the second certificate authority node is configured to authorize a second authentication certificate indicating an identity of the second network authentication service node to the second network authentication service node, authorize a second UE certificate indicating an identity of user equipment to the user equipment of the second operator, store second UE certificate revocation information and a second CA certificate indicating an identity of the second certificate authority node to a block chain, and write a second roaming license certificate authorized for the first certificate authority node into the block chain.

3. The system according to example 1 or 2, where the first CA certificate and the first UE certificate authorized by the first certificate authority node to the user equipment are preset in an identification card of the user equipment; and
the first authentication certificate authorized by the first certificate authority node to the first network authentication service node is preset in the first network authentication service node or stored in the block chain.

4. A mobile network access method, used to a first network authentication service node in a mobile network access system, and including:
receiving first access authentication information sent by user equipment of a first operator, where the first access authentication information includes a first UE certificate;
obtaining first UE certificate revocation information and a first CA certificate from a block chain;
verifying whether the first UE certificate is authorized by the first certificate authority node according to the public key in the first CA certificate, and determining whether the first UE certificate is revoked according to the first UE certificate revocation information; and
sending a second access authentication message to the user equipment of the first operator when determined that the first UE certificate is authorized by the first certificate authority node and the first UE certificate is not revoked, where the second access authentication message includes a first authentication certificate, and the first authentication certificate is configured to perform identity authentication by the user equipment of the first operator on the first network authentication service node and make the user equipment of the first operator access a mobile network under the condition that the identity authentication passes.

5. The method according to example 4, used to the first network authentication service node in example 2, and further including:
receiving third access authentication information sent by user equipment of a second operator, where the third access authentication information includes a second UE certificate;
obtaining the first CA certificate, a first roaming license certificate and a second roaming license certificate from the block chain;
on the condition that the first CA certificate, the second UE certificate, the first roaming license certificate and the second roaming license certificate have been obtained, verifying whether the first roaming license certificate is authorized by the first certificate authority node according to the public key in the first CA certificate and verifying whether the second UE certificate is authorized by a second certificate authority node according to a public key of the second certificate authority node in the second roaming license certificate; and
sending a fourth access authentication message to the user equipment of the second operator on the condition that the first roaming license certificate is authorized by the first certificate authority node and the second UE certificate is authorized by the second certificate authority node have been determined, where the fourth access authentication message includes the first authentication certificate and the first roaming license certificate, and the first authentication certificate and the first roaming license certificate are configured to perform identity authentication by the user equipment of the second operator on the first network authentication service node and make the user equipment of the second operator access the mobile network on the condition that the identity authentication passes.

6. A mobile network access method, used to a user equipment of a first operator, and including:
sending first access authentication information to the first network authentication service node, where the first network authentication service node is the first network authentication service node in the system according to any one of examples 1-3, and the first access authentication information includes a first UE certificate;
receiving the second access authentication message sent by the first network authentication service node, where the second access authentication message includes a first authentication certificate;
verifying whether the first authentication certificate is authorized by the first authority node according to the public key in a preset first CA certificate; and
accessing the user equipment to the mobile network on the condition that the first authentication certificate is authorized by the first authority node have been determined.

7. The method according to example 6, further includes:
Sending a fifth access authentication information to a second network authentication service node, where the second network authentication service node is the second network authentication service node in the system according to example 2, and the fifth access authentication information includes a second UE certificate;
receiving the sixth access authentication message sent by the second network authentication service node, where the sixth access authentication message includes a second authentication certificate and a first roaming license certificate;
verifying whether the first roaming license certificate is authorized by the first certificate authority node according to the public key in the preset first CA certificate, and verifying whether the second authentication certificate is authorized by the second certificate authority node according to the public key of the second certificate authority node in the first roaming license certificate; and
accessing the user equipment to the mobile network on the condition that the first roaming license certificate is authorized by the first certificate authority node and the second authentication certificate is authorized by the second certificate authority node have been determined.

8. A network authentication server storage medium, storing a computer program thereon, where steps of the mobile network access method according to example 4 or 5 are implemented when the program is executed by a processor.

9. A user equipment storage medium, storing a computer program thereon, where steps of the mobile network access method according to example 6 or 7 are implemented when the program is executed by a processor.

10. A network authentication server, including:
a memory, storing a computer program thereon; and
a processor, configured to execute the computer program in the memory to implement steps of the mobile network access method according to example 4 or 5.

11. A user equipment, including:
a memory, storing a computer program thereon; and
a processor, configured to execute the computer program in the memory to implement steps of the mobile network access method according to example 6 or 7.

12. A computer program, including a computer-readable code, where the computer-readable code, when running on a computing processing device, causes the computing processing device to execute the method according to example 4 or 5, or, causes the computing processing device to execute the method according to example 6 or 7.

What is claimed is:

1. A mobile network access system, comprising:
    a first network authentication service node and a first certificate authority node located in a block chain network, wherein the first network authentication service node and the first certificate authority node belong to a first operator;
    the first certificate authority node comprising a first processor and a first memory, the first processor is configured to authorize a first authentication certificate indicating an identity of the first network authentication service node to the first network authentication service node, authorize a first UE (user equipment) certificate indicating an identity of user equipment of the first operator to the user equipment of the first operator, and store first UE certificate revocation information and a first CA (certificate authority) certificate indicating an identity of the first certificate authority node to a block chain; and
    the first network authentication service node comprising a second processor and a second memory, the second processor is configured to obtain the first UE certificate revocation information and the first CA certificate from the block chain, perform mutual identity authentication with the user equipment of the first operator under the condition of receiving a first access authentication message of the user equipment of the first operator, and make the user equipment of the first operator access a mobile network under the condition of completing the mutual identity authentication;
wherein the system further comprising:
    a second network authentication service node and a second certificate authority node located in the block chain network, wherein the second network authentication service node and the second certificate authority node belong to a second operator;
    the first certificate authority node comprising the first processor that is further configured to write a first roaming license certificate authorized for the second certificate authority node into the block chain; and
    the second certificate authority node comprising a third processor and a third memory, the third processor is configured to authorize a second authentication certificate indicating an identity of the second network authentication service node to the second network authentication service node, authorize a second UE certificate indicating an identity of user equipment of the second operator to the user equipment of the second operator, store second UE certificate revocation information and a second CA certificate indicating an identity of the second certificate authority node to a block chain, and write a second roaming license certificate authorized for the first certificate authority node into the block chain.

2. The system according to claim 1, wherein the first CA certificate and the first UE certificate authorized by the first certificate authority node to the user equipment of the first operator are preset in an identification card of the user equipment of the first operator; and
    the first certificate authority node authorized by the first certificate authority node to the first network authentication service node is preset in the first network authentication service node or stored in the block chain.

3. A mobile network access method, wherein the method is performed by a first network authentication service node in a mobile network access system, the method comprising:
    receiving first access authentication information sent by user equipment of a first operator, wherein the first access authentication information comprises a first UE (user equipment) certificate;
    obtaining first UE certificate revocation information and a first CA (certificate authority) certificate from a block chain;
    verifying whether the first UE certificate is authorized by a first certificate authority node according to a public key in the first CA (certificate authority) certificate, and determining whether the first UE certificate is revoked according to the first UE certificate revocation information; and
    sending a second access authentication message to the user equipment of the first operator on the condition that determined the first UE certificate is authorized by the first certificate authority node and the first UE certificate is not revoked, wherein the second access authentication message comprises a first authentication certificate, and the first authentication certificate is configured to perform identity authentication by the user equipment of the first operator on the first network authentication service node and make the user equipment of the first operator access a mobile network on the condition that the identity authentication passes;
    receiving third access authentication information sent by user equipment of a second operator, wherein the third access authentication information comprises a second UE certificate;
    obtaining the first CA certificate, a first roaming license certificate and a second roaming license certificate from the block chain;
    on the condition that the first CA certificate, the second UE certificate, the first roaming license certificate and the second roaming license certificate have been obtained, verifying whether the first roaming license certificate is authorized by the first certificate authority node according to a public key in the first CA certificate and verifying whether the second UE certificate is authorized by the second certificate authority node according to a public key of the second certificate authority node in the second roaming license certificate; and
    sending a fourth access authentication message to the user equipment of the second operator on the condition that the first roaming license certificate is authorized by the first certificate authority node and the second UE certificate is authorized by the second certificate authority node have been determined, wherein the fourth access authentication message comprises the first authentication certificate and the first roaming license certificate, and the first authentication certificate and the first roaming license certificate are configured to perform identity authentication by the user equipment of the second operator on the first network authentication service node and make the user equipment of the second operator access the mobile network on the condition that the identity authentication passes.

4. A mobile network access method, wherein the method is performed by a user equipment of a first operator comprising:
    sending first access authentication information to a first network authentication service node, wherein the first access authentication information comprises a first UE (user equipment) certificate;

receiving a second access authentication message sent by the first network authentication service node, wherein the second access authentication message comprises a first authentication certificate;

verifying whether the first authentication certificate is authorized by a first certificate authority node according to a public key in a preset first CA (certificate authority) certificate; and accessing the user equipment to the mobile network on the condition that the first authentication certificate is authorized by the first certificate authority node have been determined;

sending fifth access authentication information to the second network authentication service node, wherein the fifth access authentication information comprises a second UE certificate;

receiving a sixth access authentication message sent by the second network authentication service node, wherein the sixth access authentication message comprises a second authentication certificate and a first roaming license certificate;

verifying whether the first roaming license certificate is authorized by the first certificate authority node according to a public key in the preset first CA certificate, and verifying whether the second authentication certificate is authorized by a second certificate authority node according to a public key of the second certificate authority node in the first roaming license certificate; and accessing the user equipment to the mobile network on the condition that the first roaming license certificate is authorized by the first certificate authority node and the second authentication certificate is authorized by the second certificate authority node have been determined.

5. A non-transitory computer-readable medium storing a computer program when executed by a processor of a network authentication server, causes the network authentication server to:

receive first access authentication information sent by user equipment of a first operator, wherein the first access authentication information comprises a first UE (user equipment) certificate;

obtain first UE certificate revocation information and a first CA (certificate authority) certificate from a block chain;

verify whether the first UE certificate is authorized by a first certificate authority node according to a public key in the first CA certificate, and determine whether the first UE certificate is revoked according to the first UE certificate revocation information; and send a second access authentication message to the user equipment of the first operator on the condition that determined the first UE certificate is authorized by the first certificate authority node and the first UE certificate is not revoked, wherein the second access authentication message comprises a first authentication certificate, and the first authentication certificate is configured to perform identity authentication by the user equipment of the first operator on the first network authentication service node and make the user equipment of the first operator access a mobile network on the condition that the identity authentication passes;

receive third access authentication information sent by user equipment of a second operator, wherein the third access authentication information comprises a second UE certificate;

obtain the first CA certificate, a first roaming license certificate and a second roaming license certificate from the block chain;

on the condition that the first CA certificate, the second UE certificate, the first roaming license certificate and the second roaming license certificate have been obtained, verify whether the first roaming license certificate is authorized by the first certificate authority node according to a public key in the first CA certificate and verifying whether the second UE certificate is authorized by the second certificate authority node according to a public key of the second certificate authority node in the second roaming license certificate; and send a fourth access authentication message to the user equipment of the second operator on the condition that the first roaming license certificate is authorized by the first certificate authority node and the second UE certificate is authorized by the second certificate authority node have been determined, wherein the fourth access authentication message comprises the first authentication certificate and the first roaming license certificate, and the first authentication certificate and the first roaming license certificate are configured to perform identity authentication by the user equipment of the second operator on the first network authentication service node and make the user equipment of the second operator access the mobile network on the condition that the identity authentication passes.

6. A non-transitory computer-readable medium storing a computer program when executed by a processor of a user equipment of a first operator, causes the user equipment of the first operator to:

send first access authentication information to a first network authentication service node, wherein the first access authentication information comprises a first UE (user equipment) certificate;

receiving a second access authentication message sent by the first network authentication service node, wherein the second access authentication message comprises a first authentication certificate;

verifying whether the first authentication certificate is authorized by a first certificate authority node according to a public key in a preset first CA (certificate authority) certificate; and accessing the user equipment to the mobile network on the condition that the first authentication certificate is authorized by the first certificate authority node have been determined;

sending fifth access authentication information to the second network authentication service node, wherein the fifth access authentication information comprises a second UE certificate;

receiving a sixth access authentication message sent by the second network authentication service node, wherein the sixth access authentication message comprises a second authentication certificate and a first roaming license certificate;

verifying whether the first roaming license certificate is authorized by the first certificate authority node according to a public key in the preset first CA certificate, and verifying whether the second authentication certificate is authorized by a second certificate authority node according to a public key of the second certificate authority node in the first roaming license certificate; and accessing the user equipment to the mobile network on the condition that the first roaming license certificate is authorized by the first certificate authority node and the second authentication certificate is authorized by the second certificate authority node have been determined.

7. A network authentication server, comprising:
a memory, storing a computer program thereon; and
a processor, configured to:
   receiving first access authentication information sent by user equipment of a first operator, wherein the first access authentication information comprises a first UE (user equipment) certificate;
   obtaining first UE certificate revocation information and a first CA (certificate authority) certificate from a block chain;
   verifying whether the first UE certificate is authorized by a first certificate authority node according to a public key in the first CA certificate, and determining whether the first UE certificate is revoked according to the first UE certificate revocation information; and
   sending a second access authentication message to the user equipment of the first operator under the condition of determining that the first UE certificate is authorized by the first certificate authority node and the first UE certificate is not revoked, wherein the second access authentication message comprises a first authentication certificate, and the first authentication certificate is configured to perform identity authentication by the user equipment of the first operator on the first network authentication service node and make the user equipment of the first operator access a mobile network under the condition that the identity authentication passes;
   receiving third access authentication information sent by user equipment of the second operator, wherein the third access authentication information comprises the second UE certificate;
   obtaining the first CA certificate, the first roaming license certificate and the second roaming license certificate from the block chain;
   on the condition that the first CA certificate, the second UE certificate, the first roaming license certificate and the second roaming license certificate have been obtained, verifying whether the first roaming license certificate is authorized by the first certificate authority node according to a public key in the first CA certificate and verifying whether the second UE certificate is authorized by the second certificate authority node according to a public key of the second certificate authority node in the second roaming license certificate; and
   sending a fourth access authentication message to the user equipment of the second operator on the condition that the first roaming license certificate is authorized by the first certificate authority node and the second UE certificate is authorized by the second certificate authority node have been determined, wherein the fourth access authentication message comprises the first authentication certificate and the first roaming license certificate, and the first authentication certificate and the first roaming license certificate are configured to perform identity authentication by the user equipment of the second operator on the first network authentication service node and make the user equipment of the second operator access the mobile network on the condition that the identity authentication passes.

8. A user equipment, comprising:
a memory, storing a computer program thereon; and a processor, configured to:
   send first access authentication information to a first network authentication service node, wherein the first access authentication information comprises the first UE (user equipment) certificate;
   receive a second access authentication message sent by the first network authentication service node, wherein the second access authentication message comprises the first authentication certificate;
   verify whether the first authentication certificate is authorized by the first authority node according to a public key in a preset first CA (certificate authority) certificate; and
   access the user equipment to the mobile network on the condition that the first authentication certificate is authorized by the first authority node have been determined;
   send fifth access authentication information to the second network authentication service node, wherein the fifth access authentication information comprises a second UE certificate;
   receive a sixth access authentication message sent by the second network authentication service node, wherein the sixth access authentication message comprises a second authentication certificate and a first roaming license certificate;
   verify whether the first roaming license certificate is authorized by the first certificate authority node according to a public key in the preset first CA certificate, and verifying whether the second authentication certificate is authorized by a second certificate authority node according to a public key of the second certificate authority node in the first roaming license certificate; and
   access the user equipment to the mobile network on the condition that the first roaming license certificate is authorized by the first certificate authority node and the second authentication certificate is authorized by the second certificate authority node have been determined.

* * * * *